United States Patent
Reddy

(10) Patent No.: US 8,125,994 B2
(45) Date of Patent: Feb. 28, 2012

(54) METHOD AND APPARATUS FOR ASSEMBLING NETWORK LAYER DATA UNITS

(75) Inventor: Radha Reddy, Birmingham (GB)

(73) Assignee: Research In Motion Limited, Waterloo, Ontario (CA)

(*) Notice: Subject to any disclaimer, the term of this patent is extended or adjusted under 35 U.S.C. 154(b) by 97 days.

(21) Appl. No.: 12/463,148

(22) Filed: May 8, 2009

(65) Prior Publication Data

US 2009/0279569 A1 Nov. 12, 2009

Related U.S. Application Data

(60) Provisional application No. 61/052,124, filed on May 9, 2008.

(51) Int. Cl.
*H04L 12/56* (2006.01)
(52) U.S. Cl. .......................................... 370/394; 370/474
(58) Field of Classification Search ................... 370/236, 370/252, 260, 310, 328, 329, 331, 349, 342, 370/394, 395.1, 395.21, 465, 466, 473, 474; 714/748, 749, 750; 455/422.1, 436, 561
See application file for complete search history.

(56) References Cited

U.S. PATENT DOCUMENTS 6,574,224 B1 * 6/2003 Brueckheimer et al. ..... 370/395.6
(Continued)

FOREIGN PATENT DOCUMENTS

WO  200245328 A1  6/2002

OTHER PUBLICATIONS

3GPP TS 25.322v5.13.0; 3rd Generation Partnership Project; Technical Specification Group Radio Access Network; Radio Link Control (RLC) Protocol Specification; Dec. 2005; 78 pgs.

(Continued)

*Primary Examiner* — Aung S Moe
*Assistant Examiner* — Abdullah Riyami
(74) *Attorney, Agent, or Firm* — Conley Rose, P.C.; J. Robert Brown, Jr.

(57) ABSTRACT

A method and apparatus for assembling a first network layer data unit from one or more second layer data units is described. The approach comprises receiving multiple second network layer data units, identifying whether all second network data layer units required for assembling a complete first network layer data unit have been received and, if not, assembling a partial first network layer data unit from the received second network data layer unit.

18 Claims, 9 Drawing Sheets

U.S. PATENT DOCUMENTS

| | | | |
|---|---|---|---|
| 6,742,045 B1* | 5/2004 | Jordan et al. | 709/238 |
| 6,819,658 B1 | 11/2004 | Agarwal et al. | |
| 7,564,851 B2* | 7/2009 | Lee et al. | 370/394 |
| 7,760,737 B2* | 7/2010 | Rana et al. | 370/394 |
| 2002/0064145 A1* | 5/2002 | Khare et al. | 370/342 |
| 2003/0056009 A1 | 3/2003 | Mizrachi et al. | |
| 2006/0159102 A1* | 7/2006 | Major | 370/395.6 |
| 2006/0262811 A1* | 11/2006 | Jiang | 370/474 |
| 2007/0291695 A1* | 12/2007 | Sammour et al. | 370/331 |
| 2008/0009289 A1* | 1/2008 | Kashima et al. | 455/436 |
| 2008/0025314 A1* | 1/2008 | Lee et al. | 370/394 |
| 2008/0186946 A1* | 8/2008 | Marinier et al. | 370/349 |
| 2008/0195911 A1* | 8/2008 | Schaap et al. | 714/748 |
| 2008/0212505 A1* | 9/2008 | Jung et al. | 370/310 |
| 2008/0225817 A1* | 9/2008 | Moon et al. | 370/342 |
| 2008/0261583 A1* | 10/2008 | Yi et al. | 455/422.1 |
| 2008/0268907 A1* | 10/2008 | Senarath et al. | 455/561 |
| 2008/0273537 A1* | 11/2008 | Meylan et al. | 370/394 |
| 2009/0116490 A1* | 5/2009 | Charpentier et al. | 370/395.1 |
| 2009/0207802 A1* | 8/2009 | Lee et al. | 370/329 |
| 2009/0225734 A1* | 9/2009 | Stephens et al. | 370/338 |
| 2010/0111036 A1* | 5/2010 | Iwamura | 370/331 |
| 2010/0182919 A1* | 7/2010 | Lee et al. | 370/252 |

OTHER PUBLICATIONS

EPO Search and Examination Report; EP Application No. 09159777.3; Oct. 5, 2009; 7 pgs.

* cited by examiner

FIG. 9

| SDU | START PDU SEQUENCE NUMBER | END PDU SEQUENCE NUMBER | SDU STATUS |
|---|---|---|---|
| 1 | 0 | 2 | START |
| 2 | 3 | 4 | END |
| 3 | 5 | 6 | MIDDLE |

FIG. 10

| SDU | START PDU SEQUENCE NUMBER | END PDU SEQUENCE NUMBER | SDU STATUS |
|---|---|---|---|
| 1 | 0 | 2 | START |
| 2 | 3 | 4 | END |
| 3 | 5 | 6 -> 7 | MIDDLE -> END |

FIG. 11

| SDU | START PDU SEQUENCE NUMBER | END PDU SEQUENCE NUMBER | SDU STATUS |
|---|---|---|---|
| 1 | 0 | 2 | START |
| 2 | 3 | 4 | END |
| 3 | 5 ->4 | 7 | END -> COMPLETED |

FIG. 12

| SDU | START PDU SEQUENCE NUMBER | END PDU SEQUENCE NUMBER | SDU STATUS |
|---|---|---|---|
| 1 | 0 | 2 | START-> COMPLETED |
| 2 | 3->2 | 4 | END -> COMPLETED |
| 3 | 4 | 7 | COMPLETED |

US 8,125,994 B2

METHOD AND APPARATUS FOR ASSEMBLING NETWORK LAYER DATA UNITS

CROSS-REFERENCE TO RELATED APPLICATIONS

The present application claims priority to U.S. provisional patent application No. 61/052,124, filed May 9, 2008, by Radha Rama Lakshmi Reddy, entitled "Method and Apparatus for Assembling Network Layer Data Units", which is incorporated by reference herein as if reproduced in its entirety.

TECHNICAL FIELD

This application relates to telecommunication systems in general, having for example application in UMTS (Universal Mobile Telecommunications System) and in particular relates to a method and apparatus for assembling network data units.

BACKGROUND

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

In the following, reference will be made to UMTS and to particular standards. However it should be understood that the present disclosure is not intended to be limited to any particular mobile telecommunications system or standard.

The radio access network covers a geographical area divided into a plurality of cell areas. Each cell area is served by at least one base station, which in UMTS may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

The 3GPP 25.322 specification V5.13.0, incorporated herein by reference and referred to herein as the 25.322 specification addresses the subject of radio link control (RLC) protocol requirements.

BRIEF DESCRIPTION OF THE DRAWINGS

Embodiments will now be described, by way of example only, with reference to the drawings, in which:

FIG. 9 is a block diagram illustrating a table of SDU entries after receipt of a first set of PDUs;

FIG. 10 shows the table of FIG. 9 updated after receiving a further PDU;

FIG. 11 shows the table of FIG. 10 updated after receiving a further PDU;

FIG. 12 shows the table of FIG. 11 updated after receiving a further PDU; and

The same reference numerals are used in different figures to denote similar elements.

DETAILED DESCRIPTION OF THE DRAWINGS

Figure 1:
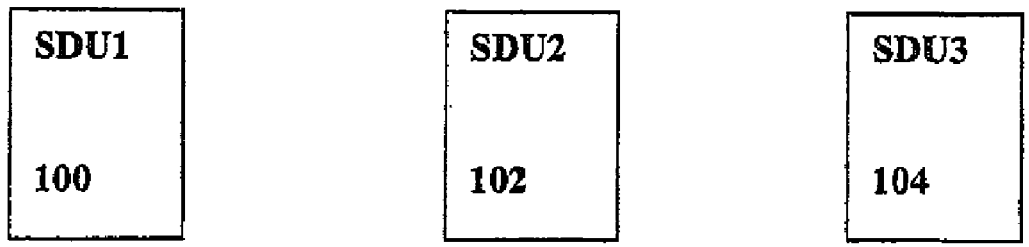
FIG. 1 shows multiple service data units (SDU)

In accordance with section 4.2.1.3.2 of the 25.3.22 specification, the manner in which service data units (SDU) are reassembled from protocol data units (PDU) is specified. Data to be transmitted is provided in SDU data packets from upper layers and segmented into PDUs which are passed to a lower layer for transmission. For example as can be seen in FIG. 1 three SDUs 100, 102, 104 denoted SDU1, SDU2, SDU3 are segmented. It will be noted that the SDUs are denoted SDU 1, 2, 3 for ease of reference but do not carry such identifiers in practice. As can be seen from FIG. 2 in the single example shown seven PDUs, PDU 0 to PDU 6 (in practice any appropriate sequence identifier may be adopted) contain the SDUs. PDU 0 has reference 200, PDU 1 reference 202, PDU 2 reference 204, PDU 3 reference 206 and, for purposes of simplicity of representation, PDUs 4 to 6 are represented as a single packet 208 although in practice would be separate packets PDU 4, PDU 5 and PDU 6. It will be seen that a PDU might contain part of an SDU. Alternately a PDU may contain multiple SDUs.

Figure 3:
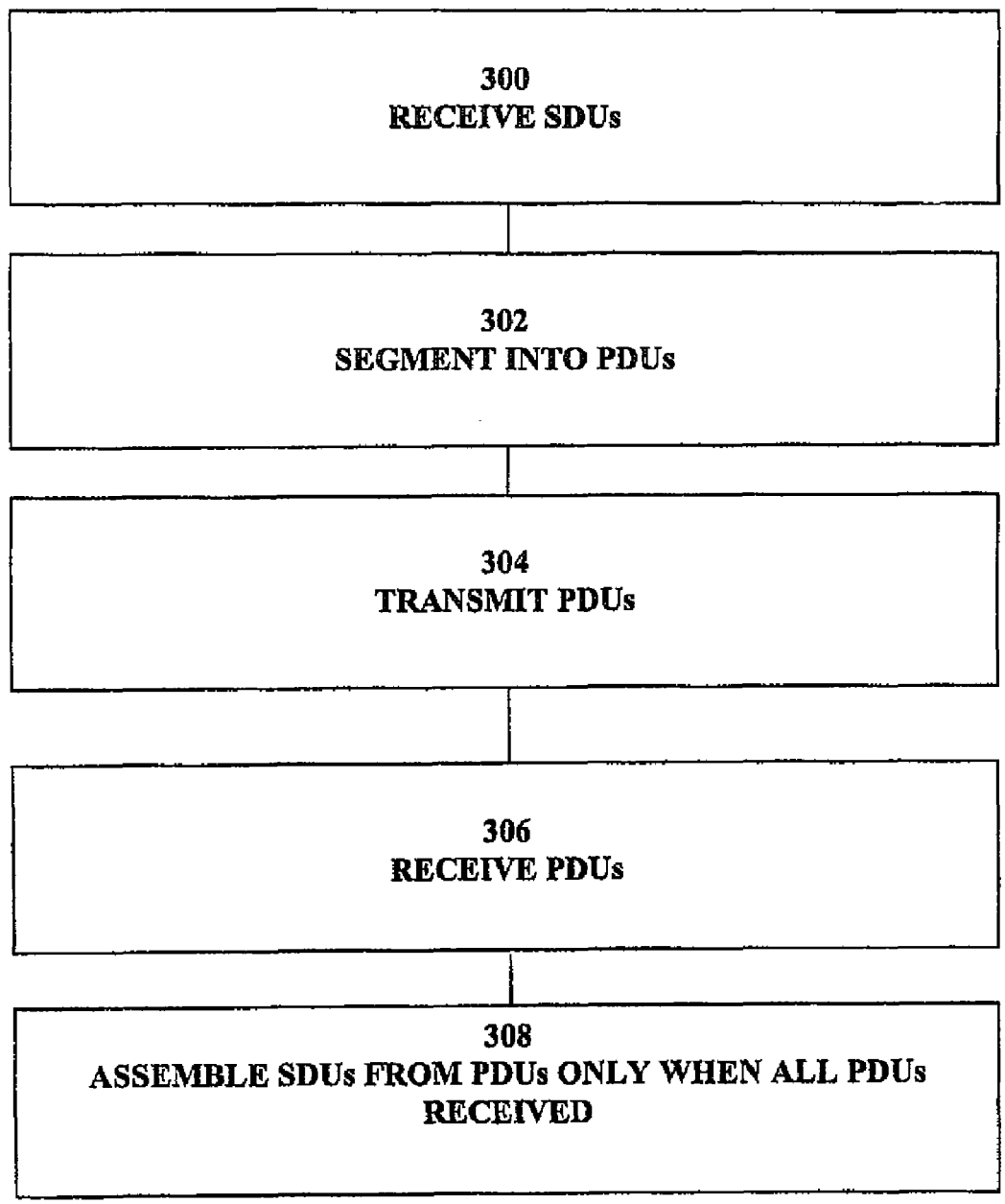
FIG. 3 is a flow diagram illustrating the manner of transmission and reassembly of SDUs according to the 25.332 specification.

According to the 25.322 specification, once a complete SDU has been received, the associated PDU's are reassembled by a reassembly unit and delivered to upper layers. The process according to the 25.322 specification can be understood with reference to FIG. 3. At the transmitter end, at 300, the SDUs are received and they are segmented at 302 into PDUs which are then transmitted at 304. At the receiving end the PDUs are received at 306 and, at 308, the SDUs are assembled from the PDUs.

However this reassembly only occurs when all of the required PDUs are received. Accordingly, as long as PDUs are received in sequence at the RLC level, the SDUs are reassembled without any delays. However if missing PDUs required for assembling a complete SDU are detected, the RLC has to wait for the missing PDUs to be retransmitted to continue the reassembly of the current pending SDU. For example if a PDU in a sequence is missing, an SDU did not terminate in the preceding PDU and only the middle or end portion of an SDU is received in the succeeding portion it is not possible to establish whether these form part of the same SDU or whether the preceding SDU was terminated in the missing PDU. As a result only when the missing PDU is received can the SDUs be reassembled with the additional information available. Any PDUs received for the first missing PDU will be saved but not processed. Once the RLC receives the remaining PDUs required to assemble the complete SDU, SDU reassembly commences, using the other PDUs received previously. A problem with this arrangement, however, is that it is extremely time consuming to process these later PDUs from the SDUs to send on to higher layers, which is wasteful of resources.

There are thus proposed strategies for a method and apparatus for assembling a first network layered unit such as an SDU from one or more second network layer data units such as a PDU. A number of such strategies are detailed herein.

Other aspects and features of the proposed strategy will become apparent to those ordinarily skilled in the art upon review of the following description of specific embodiments.

A method and apparatus for assembling a first network layer data unit such as an SDU from one or more second layer data units such as PDUs are described. In the following description, for the purposes of explanation, numerous specific details are set forth in order to provide a thorough understanding of the present disclosure. It will be apparent, however, to one skilled in the art that the technique may be practised without these specific details. In other instances, well-known structures and devices are shown in block diagram form in order to avoid unnecessarily obscuring the present disclosure.

The needs identified above, and other needs and objects that will become apparent from the following description, are achieved by, in some aspects, a method and apparatus for assembling data units. In other aspects, this disclosure encompasses a computer program product including a computer-readable medium configured to carry out the foregoing methods and a processor operating under the instructions stored therein. In particular, the method may be implemented in a mobile telecommunications device, with or without voice capabilities, or other electronic devices such as handheld or portable devices, or a network component such as in a RAN component as appropriate.

Figure 4:
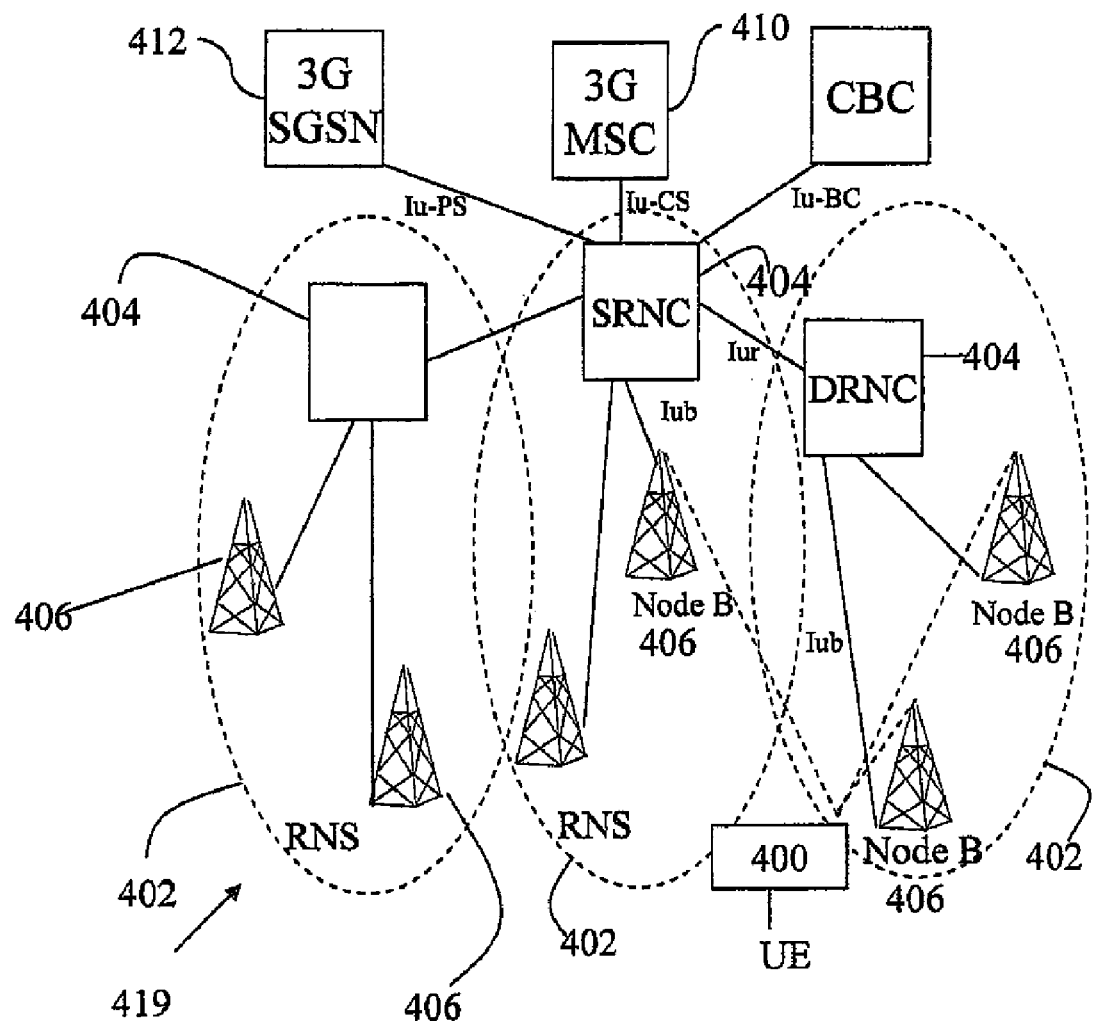
FIG. 4 is a schematic diagram showing in overview a network and a UE device.

Referring to the drawings, FIG. 4 shows an overview of a network and a UE device. Clearly in practice there may be many UE devices operating with the network but, for the sake of simplicity, FIG. 4 only shows a single UE device 400. For the purposes of illustration, FIG. 4 also shows a network 419 having a few components. It will be clear to a person skilled in the art that in practice a network will include far more components than those shown.

FIG. 4 shows an overview of the radio access network 419 (UTRAN) used in a UMTS system. The network 419 as shown in FIG. 4 comprises three Radio Network Subsystems (RNS) 402. Each RNS has a Radio Network Controller (RNC) 404. Each RNS 402 has one or more Node B 406 which are similar in function to a Base Transmitter Station of a GSM radio access network. User Equipment UE 400 may be mobile within the radio access network. Radio connections (indicated by the straight dotted lines in FIG. 4) are established between the UE and one or more of the Node Bs in the UTRAN.

The radio network controller controls the use and reliability of the radio resources within the RNS 402. Each RNC may also connected to a 3G mobile switching centre 410 (3G MSC) and a 3G serving GPRS support node 412 (3G SGSN).

An RNC 404 controls one or more Node B's. An RNC plus its Node B's together make up an RNS 402. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 406 may operate as more than one cell since it may operate at multiple frequencies and/or with multiple scrambling codes.

Figure 5:
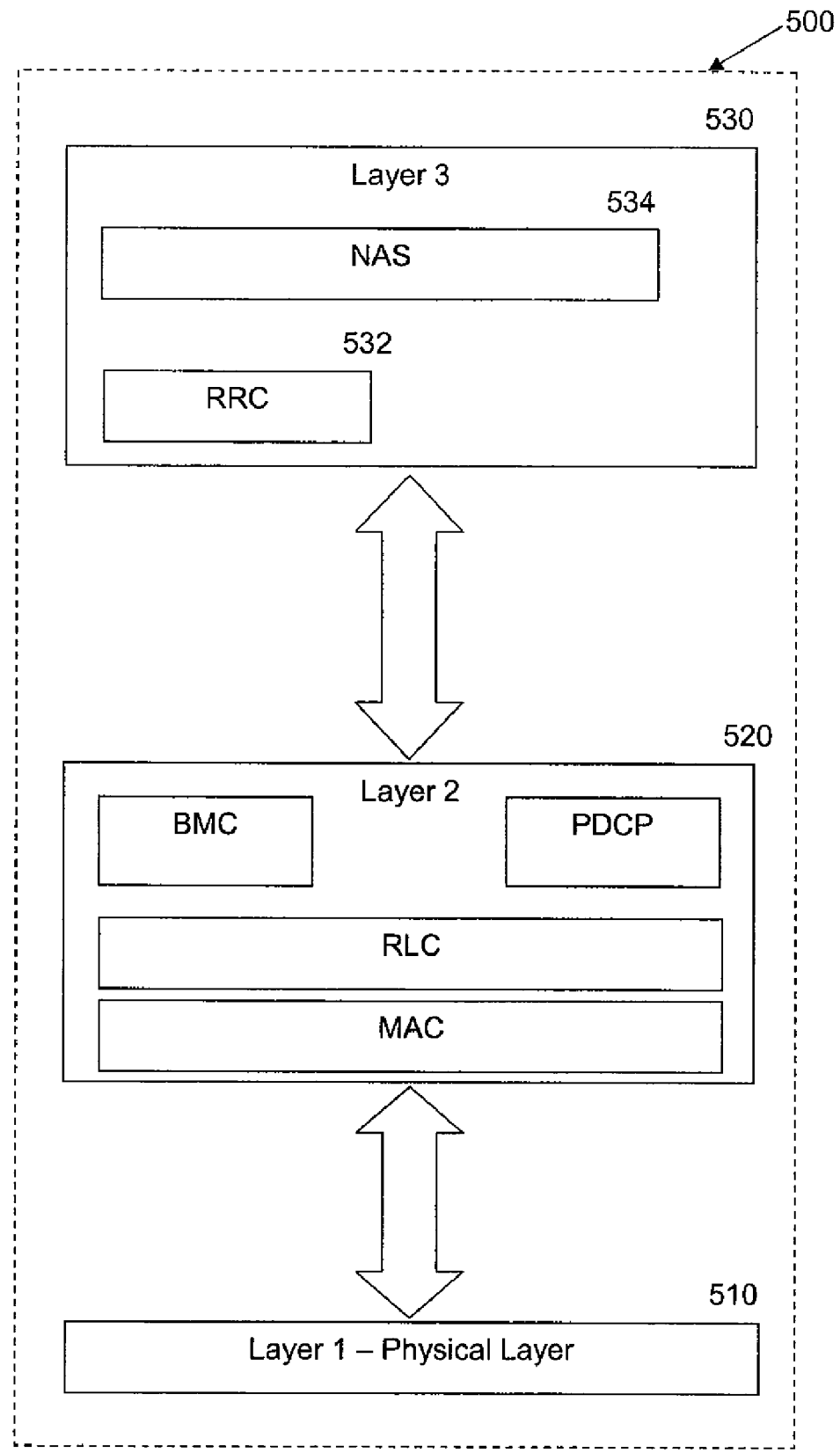
FIG. 5 is a block diagram illustrating an embodiment of a protocol stack provided in a UE.

FIG. 5 is a block diagram illustrating an embodiment of a protocol stack provided in a UE. A Radio Resource Controller (RRC) block 532 is a sub layer of Layer 3 530 of a UMTS protocol stack 500. The RRC exists in the control plane only and provides an information transfer service to the non-access stratum NAS 534. The RRC is responsible for controlling the configuration of radio interface Layer 1 510 and Layer 2 520. When the UTRAN wishes to change the UE configuration it will issue a message to the UE containing a command to invoke a specific RRC procedure. The RRC layer of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The RRC block can implement several different behaviour strategies for the method and apparatus described herein. These are summarised below, and then explained in detail subsequently, with reference to the drawings.

In overview a method of assembling of a first network layer data unit such as an SDU from one or more second network layer data units such as PDUs includes receiving multiple PDUs, identifying whether all PDUs required for assembling a complete SDU has been received and if not, assembling a partial SDU from the received PDUs. Hence an algorithm is provided to form partial SDUs from received PDUs even if one or more PDUs are missing. Once the missing PDUs have been received the relevant incomplete SDUs are completed, saving on reassembling time. It will be noted that the 25.322 specification refers to "reassembly" of the SDU, but the term "assembly" is used equivalently herein. The approach can be implemented in any appropriate system in relation to any appropriate type of data units for example RLC AM (acknowledge mode) PDUs in UMTS.

Figure 6:
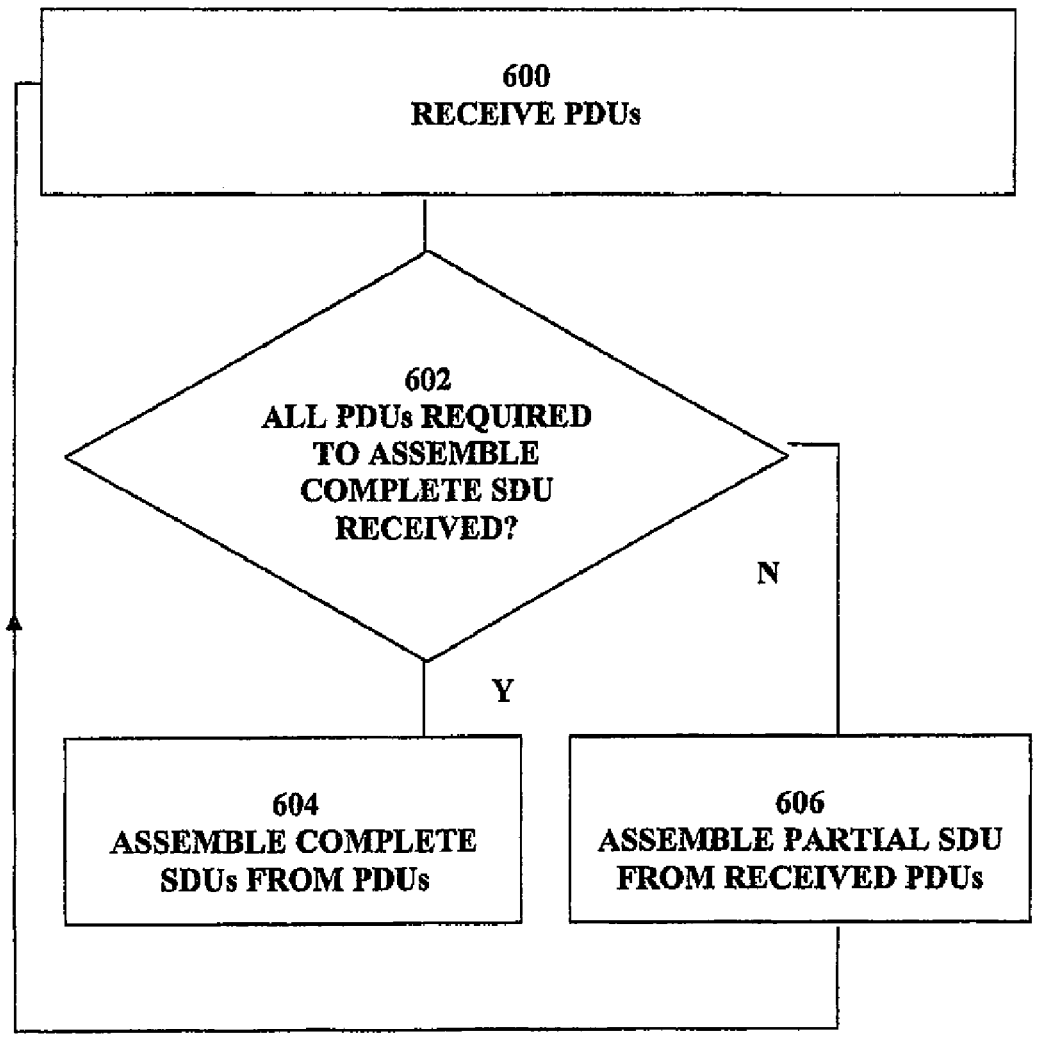
FIG. 6 is a flow diagram showing, at a high level, one way of performing the method described herein.

The present disclosure can be further understood, in overview, from FIG. 6. At the receiver, at 600, the PDUs are received and at 602 a check is performed to identify whether all PDUs required to assemble a complete SDU have been received. If they have then complete SDUs are reassembled from the PDUs at 604. However if not all of the required PDUs have been received a partial SDU is assembled from the received PDUs. The process then awaits receipt of further PDUs at 600 and, when the missing remaining PDUs required to assemble the complete SDU are received, the partial SDU is completed.

Figure 7:
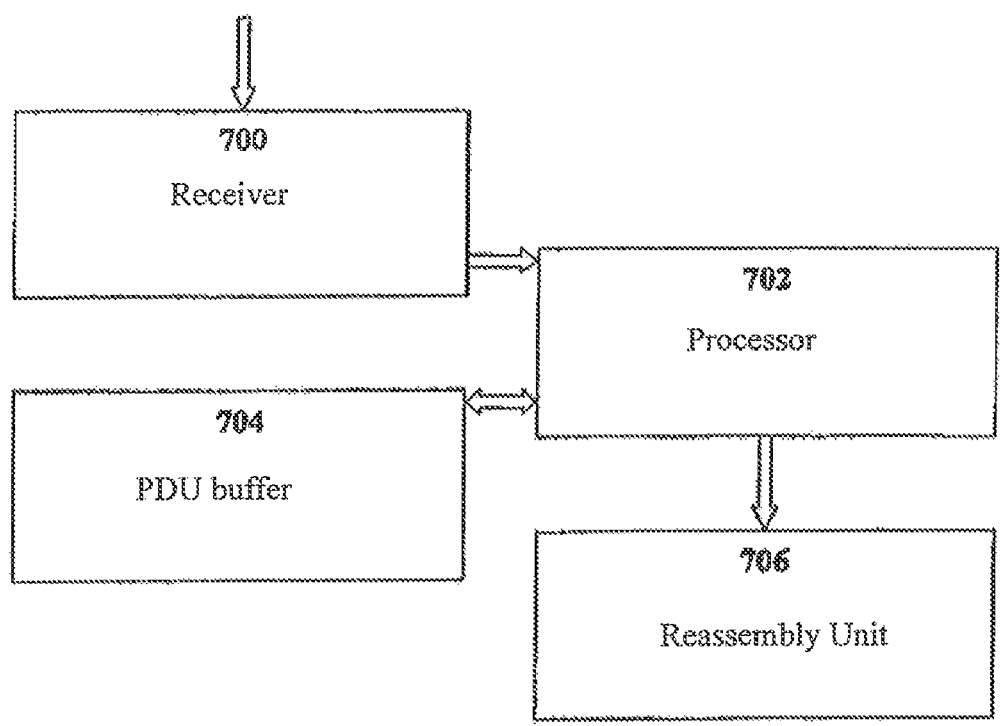
FIG. 7 is a block diagram illustrating components of an apparatus arranged to implement the method described herein.

The reassembly method described herein can be implemented on any appropriate component receiving PDUs for reassembly into SDUs, for example a user equipment or a component at the network end. The methods described herein can be implemented in hardware or software as appropriate for example using a structure shown schematically in FIG. 7. In particular a receiver 700 receives PDUs and passes these to a processor 702. The processor 702 can store PDUs in a PDU buffer 704 and can perform the methods described herein in conjunction with the reassembly unit 706 to reassemble the SDUs as described herein. It will be noted that the components shown need not be physically or logically separate but are shown as separate blocks for ease of understanding. Similarly any other appropriate architecture can be adopted.

Figure 2:
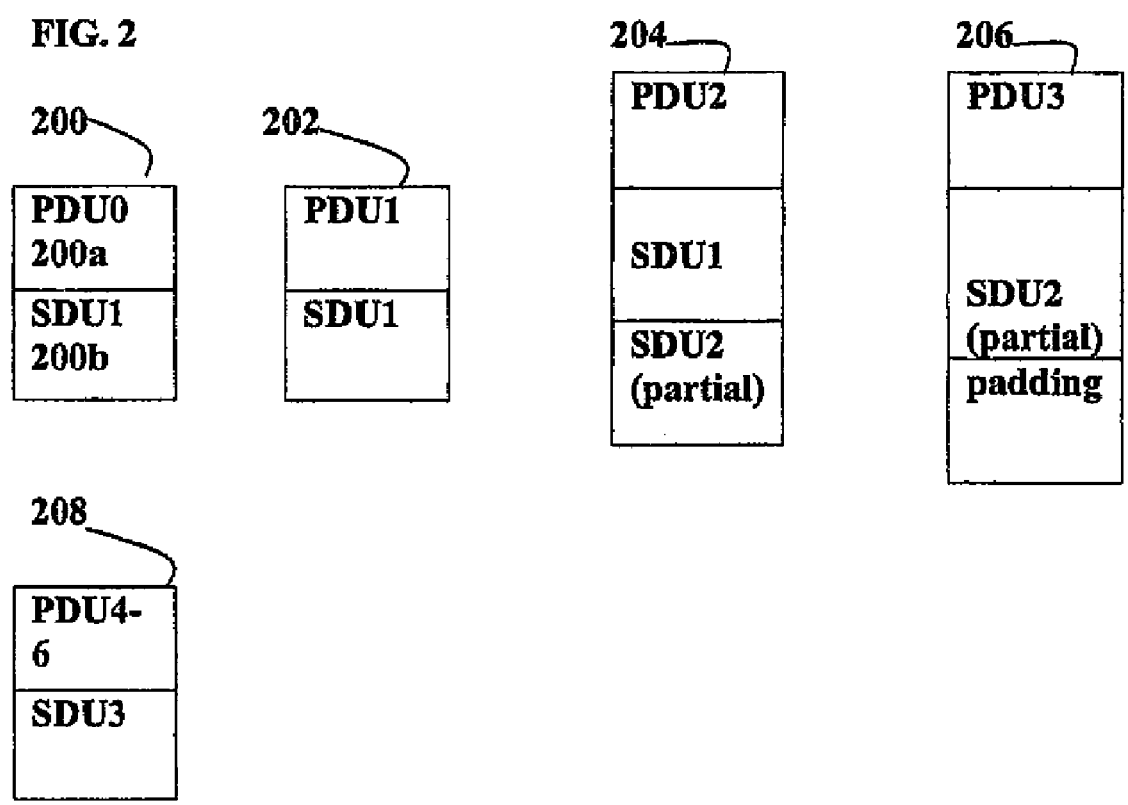
FIG. 2 shows the SDUs of FIG. 1 segmented into protocol data units (PDU)

Implementation of the method can be further understood with reference to the specific example described below in the context of the data structure described above with reference to FIG. 1 and FIG. 2. It will be noted that although the data architecture shown in FIG. 1 and FIG. 2 shows SDUs segmented according to known approaches, there is no disclosure in the prior art of the manner of reassembly described below. It will also be noted that the approach as described herein can be applied to any number of SDUs and PDUs or corresponding data architectures. A PDU can be sent in any number of forms. For example a PDU may have the start of a SDU but not the end. A PDU may have the end of an SDU and the beginning of the next SDU. The PDU may have only the middle part of an SDU. The PDU may have only the end of an SDU followed by padding. A PDU can have any number of complete SDUs.

The PDU comprises a header (see for example header 200*a* of PDU 0 in PDU 200 of FIG. 2) and a data payload 200*b*. The PDU header contains various information including a PDU sequence identifier such as a sequence number, and identification of any SDU which ends in that PDU, typically in the form of a length indicator (LI). When a PDU is being formed, (say the PDU is of size 10 bytes) the first two bytes are required for the header. If the SDU to be filled in this PDU is exactly 8 bytes, it is sent in the PDU. There is no space for the LI (to indicate that the length of the SDU is 8 bytes). In that case there is a special LI whose value is 0, and the next PDU has the first LI set as 0. It means the previous PDU has the end of the SDU.

Figure 8:
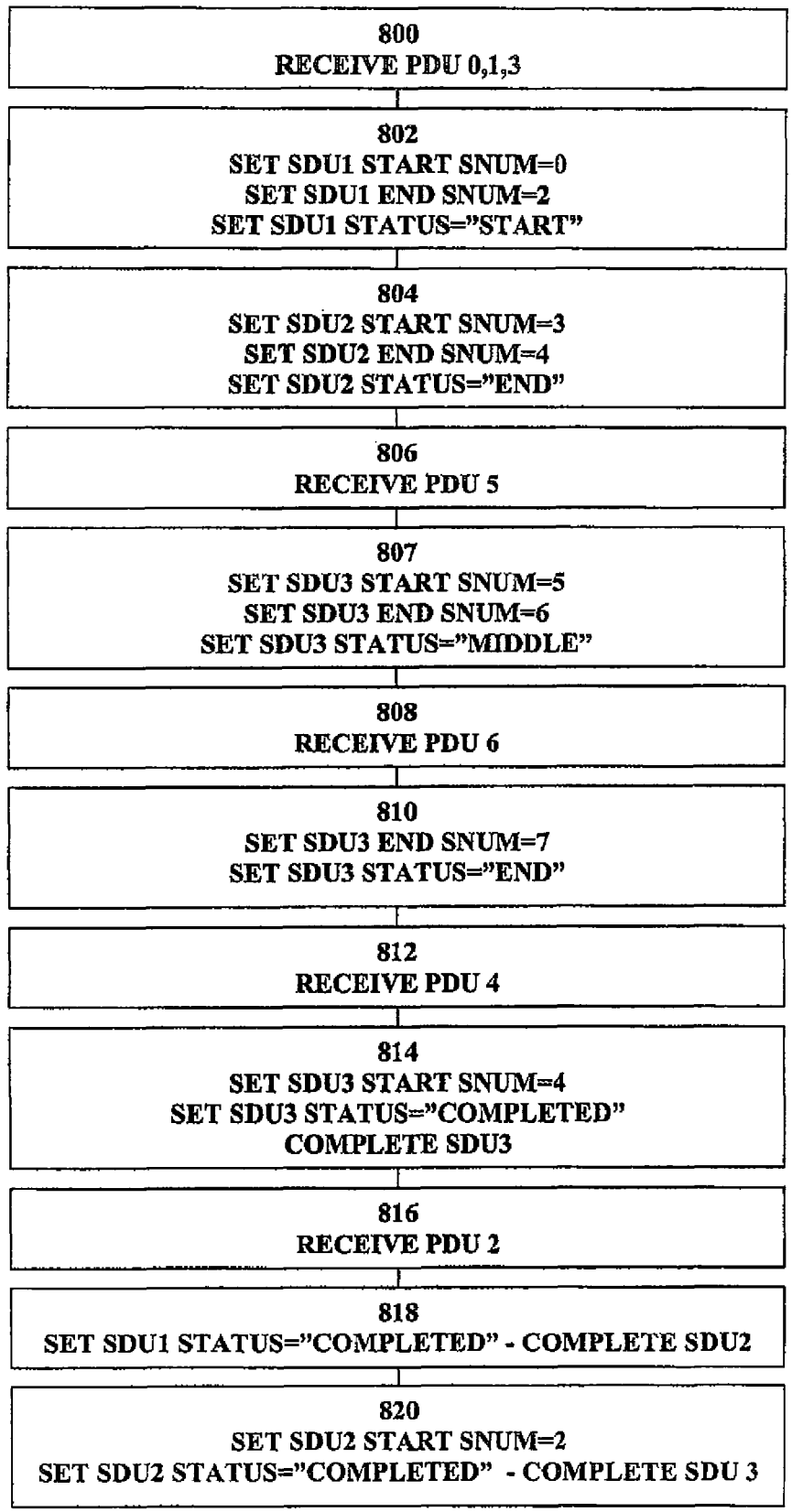
FIG. 8 is a flow diagram showing at a low level, one way of performing the method described herein.

In the specific example described below it is assumed that PDU 0, 1, 3 and 5 are received in order meaning that PDUs 2 and 4 are received out of sequence and PDU 6 has not yet been received. It will be noted that in practice the method can accommodate any number of missing PDUs at any point in time. FIG. 8 shows the method performed as the PDUs are received in conjunction with FIGS. 9 to 12 which illustrate a table maintained according to the algorithm described herein allowing the assembly of partial SDUs even if not all the information required from missing PDUs is available.

It will be seen in particular that as PDUs are received, the existence of a corresponding SDU (column 900) is inferred together with as much information as available about the possible position of the SDU in a sequence of SDUs. Associated with this SDU identifier is a start PDU sequence number (902) an end PDU sequence number (904) and a SDU status 906. In addition further information such as buffer pointers to the first received PDU that belongs to the SDU can be incorporated. If a complete SDU cannot be identified from the received PDUs then its status is marked as incomplete in one of various forms. For example for PDUs in the middle of a sequence, if a preceding PDU is missing which would have indicated the end of an SDU then it can not be inferred that the SDU in the succeeding SDU started in that PDU. In such a case its status will be set as middle. If the start of an SDU can be inferred then it is marked as start. If the end of an SDU can be inferred, for example from the information contained in the PDU header then its status is set as end. The partial SDU can then be assembled with the associated status. If all of the PDUs forming a complete SDU are received in sequence, or a missing PDU is received which allows one or more partial SDUs to be completed, then the status is set as completed and the SDU can be sent to higher layers immediately, or when all preceding SDUs in a sequence have been sent, as discussed in more detail below.

In order to populate column 902, the start PDU sequence number, if the start of an SDU in a PDU can be inferred (for example the preceding PDU in the sequence has been received and includes the end of an SDU and no subsequent SDU) then the value for the corresponding SDU is set as the known start PDU and the status is set as start. Otherwise the first known PDU forming part of the SDU is treated as the start sequence number PDU and the status is set as middle. It will be noted that upon receipt of further information it may transpire that this is in fact the correct start sequence number, or there may be an earlier PDU in the sequence which starts the SDU in which case the table will be updated when the information is received, as described in more detail below.

In order to populate the end PDU sequence number column 904, if the PDU header indication that the SDU ends then the status is set to "end". If the PDU header does not indicate that the SDU ends within that PDU—for example there is no length indicator in the PDU header which would indicate that the SDU has ended, the SDU status is set to start or middle as appropriate and the sequence number of the next expected PDU is set as the end sequence number. Although this is only an assumption, this assumption can be validated or corrected upon receipt of the missing PDUs, allowing creation of the partial SDU in the meantime.

By maintaining the start and end PDU sequence numbers, locating a PDU received out of sequence within an existing sequence, and discarding of duplicate received PDUs, can be achieved more easily. In particular when assessing where an out of sequence PDU fits in an existing set of received PDUs, the existing start and end sequence numbers can be assessed to identify the correct location. As the start sequence number is always the first known sequence number, it corresponds to a received PDU meaning that if an out of sequence PDU has the same number as a start sequence number it must be a duplicate and can be discarded. Similarly the position of a PDU with the immediately preceding sequence number can be instantly derived.

If a PDU is received having a special length information value 0 (signifying that the previous PDU has the end of an SDU) a further status "SP_START" can be used. If a PDU with LI=0 is received then the system checks whether the previous PDU has been received successfully. If it has been received successfully then the previous SDU is marked as SDU_END/COMPLETED. If, however, the previous PDU is yet to be received, an entry SP_START is made against the PDU with LI=0 and the start and end sequence number are set as the sequence number of that PDU. When the previous PDU is received the next entry is searched. If the next entry is marked SP_START then the SDU in the preceding PDU is marked as END and the SPU_START entry is deleted.

As described in more detail below in relation to the specific example, according to one embodiment, to enable a search algorithm to detect whether a PDU has already been received or not, additionally the end PDU sequence number may be set to the number of the next PDU in the sequence (PDU sequence number plus 1) if the PDU has only the end of an SDU followed by padding but not the beginning of a new SDU. However if the PDU includes the end of the SDU and the beginning of a new SDU then the end sequence number is set to the current PDU sequence number.

Then, if the end sequence number of an SDU matches the start sequence number of the succeeding SDU it can be inferred that the PDU with that sequence number has been received, again making it easier to identify discardable duplicates.

It will be seen that there is no requirement for maintenance of a status table of received PDUs and their relationship to SDUs and corresponding status until a PDU has been missed. After this SDUs are added and their status included and partial SDUs assembled until an SDU is completed and can be sent to higher layers.

Accordingly where three SDUs 100, 102, 104 as shown in FIG. 1 are segmented into PDUs 0 to 6 as shown in FIG. 2, SDU 1 being contained in PDUs 0, 1, 2, SDU 2 in PDUs 2 and 3, PDU 3 further including padding after the end of SDU 2, and SDU 3 being contained in PDUs 4, 5 and 6, the approach adopted if PDUs are not received in sequence can be further understood from FIG. 8. For example if PDUs 0, 1, 3 are received at 800, the sequence number being derivable from the PDU headers, the process identifies that a PDU is missing. As PDU 0 is the first in the sequence the corresponding SDU is treated as the first SDU, and labelled SDU 1 in the table of FIG. 9. At 802 the start PDU sequence number for SDU 1 is set as sequence number 0 the end of SDU 1 is not found in the received PDUs, the end sequence number is set to 2, the sequence number of the next expected PDU. The status of SDU 1 is set to start and the SDU is partially assembled using the data from PDU 0 and PDU 1. At 804, as PDU 3 is not the next PDU in the sequence, the contents of the PDU are treated as a new SDU, SDU 2. In fact it will be seen that until PDU 2 has been received it cannot be ascertained if PDU 3 has SDU or SDU 2 and so it is treated as a new SDU until receipt of additional information. If PDU 2 itself merely contained a non-terminated continuation of SDU 1 then upon receipt of PDU 2, the entry for PDU 3 would be amended to clarify the SDU was the end of SDU 1.

In the present case, however, the PDU header PDU 3 will identify the end of an SDU followed by padding such that the status can be set to end. As indicated above, the end PDU sequence number is in fact set to 4, the sequence number for the next expected PDU, for purposes of rendering searching easier. Subsequently when a PDU is received out of sequence it is possible to search in the entries to find its position in the table. If it is a duplicate PDU corresponding to an already received PDU this duplicate should be discarded. Because the end sequence number is set to the number of the next expected PDU when the PDU does not contain the beginning of another SDU, and the status of the SDU is set to end the end sequence number will be equal to the next SDU entries start sequence number. From this it will be clear that the PDU has already been received.

Upon receipt of PDU 5, at 806 as PDU 4 has not been received the SDU is treated as a new SDU, SDU 3. However many PDUs are omitted; until further information is available the SDU will be treated as the next available SDU. At 807, as it can be derived from the header that PDU 5 does not contain the end of the SDU, the end sequence number is set as that of the next expected PDU, sequence number 6. As neither the start nor the end has been inferred the status is set to middle.

At 808 PDU 6 is received. As PDU 6 contains the end of an SDU the end sequence number is set to the next expected PDU sequence number 7, and the status is set to end as shown in 810 and FIG. 10.

At 812 PDU 4 is received and at 814, as it is known that SDU 2 terminated in PDU 3 and there is no SDU termination in PDU 4, the start sequence number for SDU 3 is inferred and set to sequence number 4. As a result all of SDU 3 has now been received and the status can be set to completed as shown in FIG. 11. As a result SDU 3 can be completed and sent to higher layers immediately or in sequence as discussed below.

At 816 PDU 2 is received and, as shown in FIG. 12 the end PDU sequence can be confirmed as sequence number 2, the SDU status can be set to completed and SDU 1 can be completed and sent to higher layers immediately. The remaining part of the PDU has the start of SDU 2, the end of that SDU being already available and all PDUs in the relevant part of the sequence having been received. Accordingly the start sequence number of SDU 2 is set to 2 and the status is set to completed. Then the SDU is combined to form the complete SDU and sent to higher layers immediately.

It will be seen that the algorithm will continue as long as required and each time the next entry in the table is picked to see if any PDU is being waited for. If the status is marked as completed then the SDU is completed and sent to higher layers immediately or in sequence. In case the status is either start or middle then the process waits for further PDUs to be received.

In some instances a value is set for sequence delivery=True/False such that RLC is requested to send the completed SDUs to higher layers in sequence or out of sequence. In case it is set to "in sequence", although the later SDUs are formed completely when we are waiting for the missing PDU (supposed to be the first SDU), the completed SDUs cannot be sent to higher layers. So, the status is marked as COMPLETED and the SDUs are not sent from RLC. When the first SDU is COMPLETED after receiving the first missing PDU, the SDU is sent to higher layers and the queue is checked to see if there are any more 'COMPLETED' SDUs. If so, they are sent to higher layers one after the other in sequence until the status is found to be 'STARTED', from which it is clear that the next SDU is incomplete and waiting for the next PDU. In case of "out of sequence" delivery, the SDUs that are formed completely can be sent to higher layers irrespective of the order. However, the status of the SDUs is marked as SDU_SENT in column 906 to identify that the SDU has been formed completely and has also been sent to higher layers. This entry is required in the table for duplicate search. When the first SDU is COMPLETED after receiving the missing PDU, it is sent to higher layers. The queue is checked for SDU_SENT SDUs and any found are deleted. The search stops when an SDU with status STARTED is found.

Figure 13:
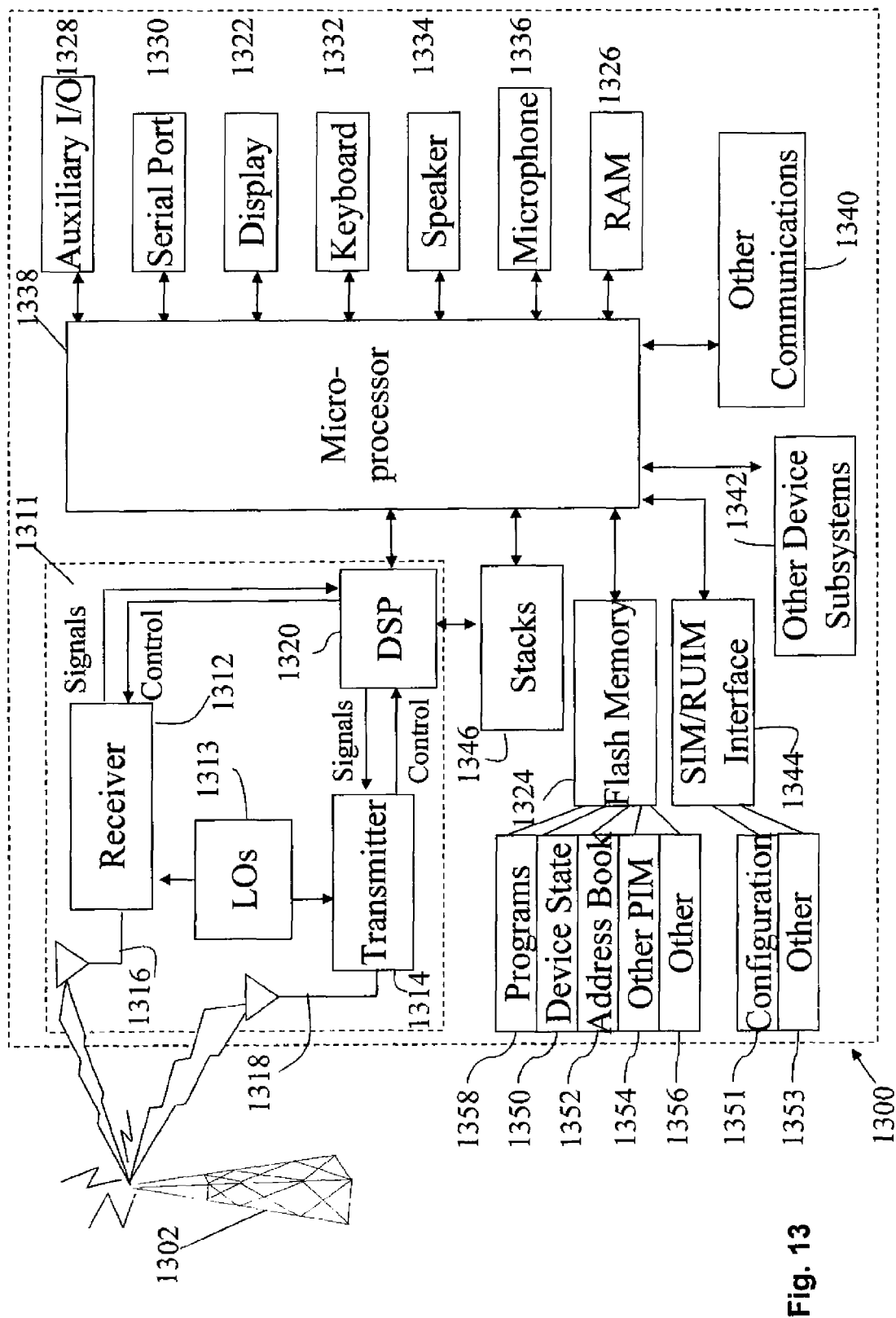
FIG. 13 is a block diagram illustrating a mobile device which can act as an UE in accordance with the approach as described herein.

Turning now to FIG. 13, FIG. 13 is a block diagram illustrating a mobile device, which can act as a UE and co-operate with the apparatus and methods of FIGS. 1 to 12, and which is an exemplary wireless communication device. Mobile station 1300 is preferably a two-way wireless communication device having at least voice and data communication capabilities. Mobile station 1300 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples. The SDU can be formed completely and sent to higher layers.

Where mobile station 1300 is enabled for two-way communication, it will incorporate a communication subsystem 1311, including both a receiver 1312 and a transmitter 1314, as well as associated components such as one or more, preferably embedded or internal, antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the device is intended to operate. For example, mobile station 1300 may include a communication subsystem 1311 designed to operate within the Mobitex™ mobile communication system, the DataTAC™ mobile communication system, GPRS network, UMTS network, or EDGE network.

Network access requirements will also vary depending upon the type of network 1302. For example, in the Mobitex and DataTAC networks, mobile station 1300 is registered on the network using a unique identification number associated with each mobile station. In UMTS and GPRS networks, however, network access is associated with a subscriber or user of mobile station 1300. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 1300 will be unable to carry out any other functions involving communications over the network 1302. The SIM interface 1344 is normally similar to a card-slot into which a SIM card can be inserted and ejected like a diskette or PCMCIA card. The SIM card can have approximately 64K of memory and hold many key configuration 1351, and other information 1353 such as identification, and subscriber related information.

When required network registration or activation procedures have been completed, mobile station 1300 may send and receive communication signals over the network 1302. Signals received by antenna 1316 through communication network 1302 are input to receiver 1312, which may perform such common receiver functions as signal amplification, frequency down conversion, filtering, channel selection and the like, and in the example system shown in FIG. 13, analog to digital (A/D) conversion. AND conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up conversion, filtering, amplification and transmission over the communication network 1302 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

Mobile station 1300 preferably includes a microprocessor 1338 which controls the overall operation of the device. Communication functions, including at least data and voice communications, are performed through communication subsystem 1311. Microprocessor 1338 also interacts with further device subsystems such as the display 1322, flash memory 1324, random access memory (RAM) 1326, auxiliary input/output (I/O) subsystems 1328, serial port 1330, keyboard 1332, speaker 1334, microphone 1336, a short-range communications subsystem 1340 and any other device subsystems generally designated as 1342.

Some of the subsystems shown in FIG. 13 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the microprocessor 1338 is preferably stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Microprocessor 1338, in addition to its operating system functions, preferably enables execution of software applications on the mobile station. A predetermined set of applications that control basic operations, including at least data and voice communication applications for example, will normally be installed on mobile station 1300 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1302. In a preferred embodiment, the PIM data items are seamlessly integrated, synchronized and updated, via the wireless network 1302, with the mobile station user's corresponding data items stored or associated with a host computer system. Further applications may also be loaded onto the mobile station 1300 through the network 1302, an auxiliary I/O subsystem 1328, serial port 1330, short-range communications subsystem 1340 or any other suitable subsystem 1342, and installed by a user in the RAM 1326 or preferably a non-volatile store (not shown) for execution by the microprocessor 1338. Such flexibility in application installation increases the functionality of the device and may provide enhanced on-device functions, communication-related functions, or both. For example, secure communication applications may enable electronic commerce functions and other such financial transactions to be performed using the mobile station 1300.

In a data communication mode, a received signal such as a text message or web page download will be processed by the communication subsystem 1311 and input to the microprocessor 1338, which preferably further processes the received signal for output to the display 1322, or alternatively to an auxiliary I/O device 1328. A user of mobile station 1300 may also compose data items such as email messages for example, using the keyboard 1332, which is preferably a complete alphanumeric keyboard or telephone-type keypad, in conjunction with the display 1322 and possibly an auxiliary I/O device 1328. Such composed items may then be transmitted over a communication network through the communication subsystem 1311.

For voice communications, overall operation of mobile station 1300 is similar, except that received signals would preferably be output to a speaker 1334 and signals for transmission would be generated by a microphone 1336. Alternative voice or audio I/O subsystems, such as a voice message recording subsystem, may also be implemented on mobile station 1300. Although voice or audio signal output is preferably accomplished primarily through the speaker 1334, display 1322 may also be used to provide an indication of the identity of a calling party, the duration of a voice call, or other voice call related information for example.

Serial port 1330 in FIG. 13, would normally be implemented in a personal digital assistant (PDA)-type mobile station for which synchronization with a user's desktop computer (not shown) may be desirable, but is an optional device component. Such a port 1330 would enable a user to set preferences through an external device or software application and would extend the capabilities of mobile station 1300 by providing for information or software downloads to mobile station 1300 other than through a wireless communication network. The alternate download path may for example be used to load an encryption key onto the device through a direct and thus reliable and trusted connection to thereby enable secure device communication.

Other communications subsystems 1340, such as a short-range communications subsystem, is a further optional component which may provide for communication between mobile station 1300 and different systems or devices, which need not necessarily be similar devices. For example, the subsystem 1340 may include an infrared device and associated circuits and components or a Bluetooth™ communication module to provide for communication with similarly enabled systems and devices.

When mobile device 1300 is used as a UE, protocol stacks 1346 may include apparatus and a method for assembling and reassembling data units in, for example, a UMTS or other network environments.

The skilled reader will appreciate that any appropriate manner for implementing the methods or any portion thereof, described above at the UTRAN or UE, can be adopted in hardware, software or firmware. For example the additional identification or acknowledgement portions can be implemented at the respective components in any appropriate manner.

EXTENSIONS AND ALTERNATIVES

In the foregoing specification, the disclosure has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods are described using a particular order. However, it would be clear to a person skilled in the art that the order can be varied where the context permits and to that extent the ordering is not limiting.

It will be further understood that the method and apparatus described herein can be applied in relation to any data unit requiring segmentation and reassembly between layers and between any appropriate user equipment components and access network components. For example the reassembly technique can be used to reassemble messages received at the user equipment or at a network component as appropriate.

Although the approach is described in the context of AM RLC SDUs UMTS the approach is equally applicable to any other appropriate protocol or standard.

Although the status tables for SDUs are shown in a specific format it will be noted that they can be stored in any machine or user readable form and order and in any appropriate storage medium, and that the status, sequence numbers and SDU identifiers can be presented in any appropriate form.

It is also to be noted that where a method has been described it is also intended that protection is also sought for a device arranged to carry out the method and where features have been claimed independently of each other these may be used together with other claimed features.

It will further be understood that the method and apparatus described herein can be applied in relation to any release or similar procedure following methods as set out in any appropriate standard and between any appropriate user equipment components and access network components or indeed between components of a similar nature in any case where power between links in respect of directions is controlled by the link channel in the opposite direction where either can be an uplink or downlink.

Furthermore it will be noted that the apparatus described herein may comprise a single component such as a UE or UTRAN or other user equipment or access network components, a combination of multiple such components for example in communication with one another or a sub-network or full network of such components.

What is claimed is:

1. A method of assembling a service data unit (SDU) from one or more protocol data units (PDUs), the method comprising:
   receiving multiple PDUs, each PDU having a PDU sequence number, each PDU comprising one or more partial or complete SDUs;
   inferring the existence of the one or more SDUs from the received PDUs;
   assigning a PDU start sequence number, and a PDU end sequence number to the one or more SDUs;
   identifying whether all the PDUs required for assembling a complete SDU have been received and, if not:
   assigning an SDU status to the one or more SDUs;
   assembling a partial SDU from the received PDUs using the assigned PDU start and/or end sequence numbers and assigned SDU status;
   receiving an out of sequence PDU; and
   validating or correcting the assembled partial SDU's assigned PDU start sequence number, the assigned PDU end sequence number, and the assigned SDU status based on the received out of sequence PDU by comparing the PDU sequence number of the out of sequence PDU with the assigned start and/or end PDU sequence numbers.

2. A method as claimed in claim 1 in which each PDU has a sequence identifier.

3. A method as claimed in claim 2 in which identification of whether all the PDUs required for assembling a complete SDU have been received is performed by identifying from the sequence identifiers of received PDUs whether all PDUs in a sequence containing all of the SDU have been received.

4. A method as claimed in claim 1 in which incomplete status is assigned to the partial SDU.

5. A method as claimed in claim 4 in which the incomplete status is one of an incomplete start, middle or end status.

6. A method as claimed in claim 1 in which at least one of the PDU start sequence number and the PDU end sequence number is assigned to the partial SDU, and in which, upon receipt of the out of sequence PDU, a corresponding SDU is identified by comparing the sequence number of the out of sequence number with start and end sequence numbers assigned to SDUs.

7. A method as claimed in claim 6 in which, upon receipt of a duplicate PDU, the duplicate PDU is discarded if identified by comparing its sequence number with start and end sequence numbers assigned to SDUs.

8. A method as claimed in claim 1 further comprising, upon receipt of the remaining PDUs required to assemble the complete SDU, completing the partial SDU.

9. An apparatus for assembling a service data unit (SDU) from one or more protocol data units (PDUs), the apparatus comprising:
   a receiver arranged to receive multiple PDUs, each PDU having a PDU sequence number, each PDU comprising one or more partial or complete SDUs;
   a processor arranged to infer the existence of the one or more SDUs from the received PDUs; the processor further arranged to assign a PDU start sequence number, and a PDU end sequence number to the one or more SDUs, the processor further arranged to identify whether all the PDUs required for assembling a complete SDU have been received and, if not, the processor further arranged to assign an SDU status to the one or more SDUs;
   the processor being further arranged to assemble a partial SDU from the received PDUs, using the assigned PDU start and/or end sequence numbers and assigned SDU status; the receiver arranged to receive an out of sequence PDU, and the processor arranged to validate or correct the assembled partial SDU's assigned PDU start sequence number and/or the assigned PDU end sequence number, and the assigned SDU status based on the received out of sequence PDU by comparing the PDU sequence number of the out of sequence PDU with the assigned start and/or end PDU sequence numbers.

10. An apparatus as claimed in claim 9 in which each PDU has a sequence identifier.

11. An apparatus as claimed in claim 10 in which the processor is arranged to perform identification of whether all the PDUs required for assembling a complete SDU have been received by identifying from the sequence identifiers of received PDUs whether all PDUs in a sequence have been received.

12. An apparatus as claimed in claim 9 in which incomplete status is assigned to the partial SDU.

13. An apparatus as claimed in claim 12 in which the incomplete status is one of an incomplete start, middle or end status.

14. An apparatus as claimed in claim 9 in which the processor is further arranged, upon receipt of the remaining PDUs required to assemble the complete SDU, to complete the partial SDU.

15. An apparatus as claimed in claim 9 in which at least one of the PDU start sequence number and the PDU end sequence number is assigned to the partial SDU.

16. An apparatus as claimed in claim 15 in which, upon receipt of the out of sequence PDU, a corresponding SDU is identified by comparing the sequence number of the out of sequence number and start and end sequence numbers assigned to SDUs.

17. A computer program product, comprising:
   a non transitory computer readable medium; and
   computer instructions stored in the non transitory computer readable medium;
   the computer instructions being executable by one or more processors to assemble an SDU from one or more PDUs, by:
   receiving multiple PDUs, each PDU having a PDU sequence number, each PDU comprising one or more partial or complete SDUs;
   inferring the existence of the one or more SDUs from the received PDUs;
   assigning a PDU start sequence number, and a PDU end sequence number to the one or more SDUs;
   identifying whether all the PDUs required for assembling a complete SDU have been received and, if not, assigning an SDU status to the one or more SDUs;
   assembling a partial SDU from the received PDUs, using the assigned PDU start and/or end sequence numbers and assigned SDU status; receiving an out of sequence PDU; and
   validating or correcting the assembled partial SDU's assigned PDU start sequence number and/or the assigned PDU end sequence number, and the assigned SDU status based on the received out of sequence PDU by comparing the PDU sequence number of the out of sequence PDU with the assigned start and/or end PDU sequence numbers.

18. A processor configured to operate according to the instructions stored in the computer program product of claim 17.

* * * * *